(12) United States Patent
Chang et al.

(10) Patent No.: US 11,009,643 B2
(45) Date of Patent: May 18, 2021

(54) LAMINATE AND LIQUID CRYSTAL DISPLAY DEVICE COMPRISING SAME

(71) Applicant: LG CHEM, LTD., Seoul (KR)

(72) Inventors: Junwon Chang, Daejeon (KR); Nayoung Shin, Daejeon (KR); Moon Soo Park, Daejeon (KR); Kyun Il Rah, Daejeon (KR)

(73) Assignee: LG CHEM, LTD, Seoul (KR)

( * ) Notice: Subject to any disclaimer, the term of this patent is extended or adjusted under 35 U.S.C. 154(b) by 0 days.

(21) Appl. No.: 16/971,648

(22) PCT Filed: Jun. 3, 2019

(86) PCT No.: PCT/KR2019/006661
§ 371 (c)(1),
(2) Date: Aug. 20, 2020

(87) PCT Pub. No.: WO2019/235794
PCT Pub. Date: Dec. 12, 2019

(65) Prior Publication Data
US 2020/0393606 A1   Dec. 17, 2020

(30) Foreign Application Priority Data
Jun. 5, 2018 (KR) .................. 10-2018-0064879

(51) Int. Cl.
*G02F 1/1335* (2006.01)
*G02B 5/30* (2006.01)
*G02F 1/13363* (2006.01)

(52) U.S. Cl.
CPC ..... *G02B 5/3083* (2013.01); *G02F 1/133528* (2013.01); *G02F 1/133634* (2013.01); *G02F 1/133531* (2021.01); *G02F 1/133631* (2021.01); *G02F 1/133638* (2021.01); *G02F 2413/03* (2013.01); *G02F 2413/07* (2013.01); *G02F 2413/08* (2013.01); *G02F 2413/13* (2013.01)

(58) Field of Classification Search
CPC .................................................. G02B 5/3083
See application file for complete search history.

(56) References Cited

U.S. PATENT DOCUMENTS

| | | | |
|---|---|---|---|
| 2005/0151896 A1 | 7/2005 | Hara et al. | |
| 2007/0279553 A1* | 12/2007 | Yoda | G02F 1/13363 349/96 |
| 2010/0201924 A1* | 8/2010 | Wu | G02F 1/133555 349/102 |
| 2015/0015830 A1* | 1/2015 | Kim | G02F 1/133528 349/96 |
| 2015/0070764 A1 | 3/2015 | Hatanaka et al. | |
| 2015/0153497 A1* | 6/2015 | Chang | G02F 1/13363 349/194 |

FOREIGN PATENT DOCUMENTS

| | | |
|---|---|---|
| CN | 104280927 A | 1/2015 |
| JP | 2015-40904 A | 3/2015 |

(Continued)

*Primary Examiner* — Sang V Nguyen
(74) *Attorney, Agent, or Firm* — Dentons US LLP

(57) ABSTRACT

This application relates to a laminate comprising: a first half wave plate; a second half wave plate; and a positive C plate provided between the first half wave plate and the second half wave plate and a liquid crystal display comprising the same.

8 Claims, 4 Drawing Sheets

(56) References Cited

FOREIGN PATENT DOCUMENTS

| | | |
|---|---|---|
| JP | 2015-40905 A | 3/2015 |
| JP | 2018-60152 A | 4/2018 |
| KR | 10-2004-0097373 A | 11/2004 |
| KR | 10-2015-0007518 A | 1/2015 |
| KR | 10-2015-0029562 A | 3/2015 |
| KR | 10-2015-0109852 A | 10/2015 |
| KR | 10-2016-0112380 A | 9/2016 |
| KR | 10-1694587 B1 | 1/2017 |
| TW | I422916 B | 1/2014 |
| TW | I574088 B | 3/2017 |

* cited by examiner

[Figure 1]
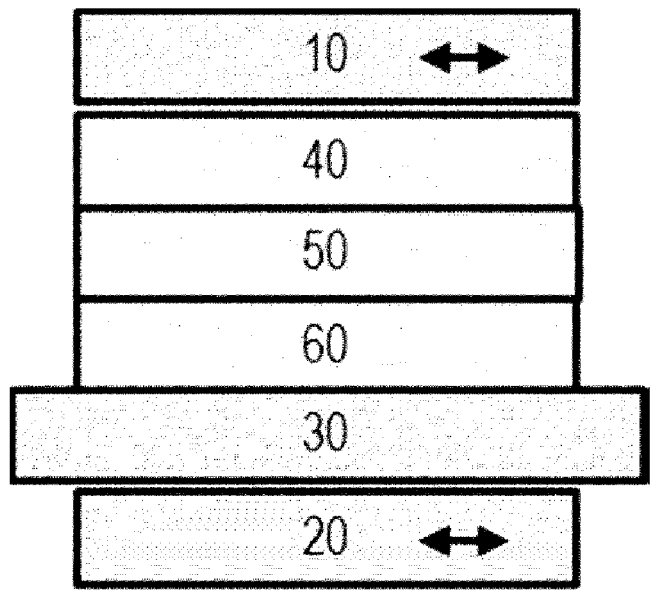
[Figure 2]
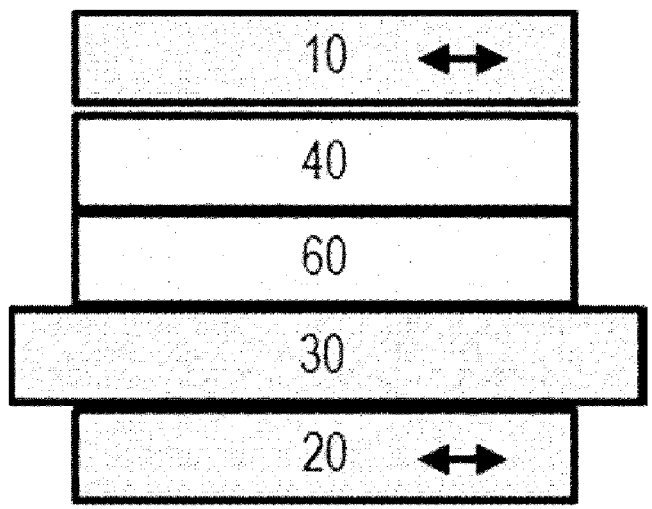

[Figure 3]
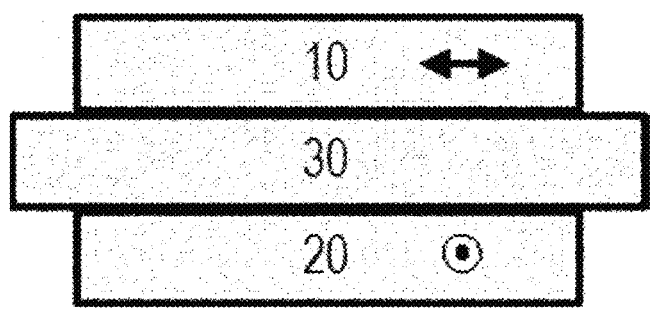
[Figure 4]
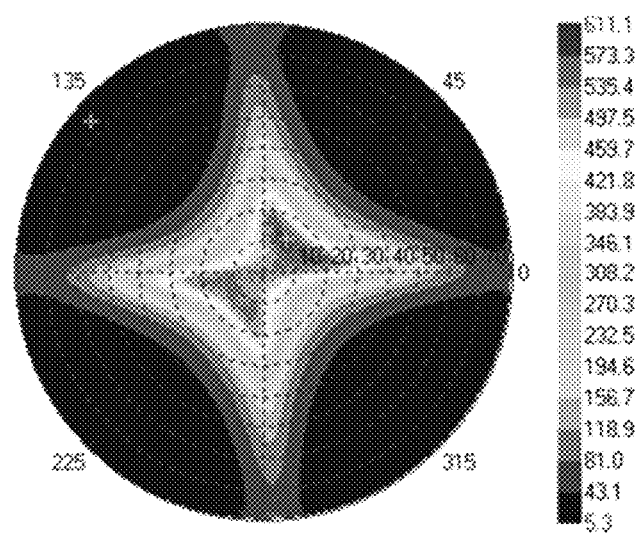

[Figure 5]
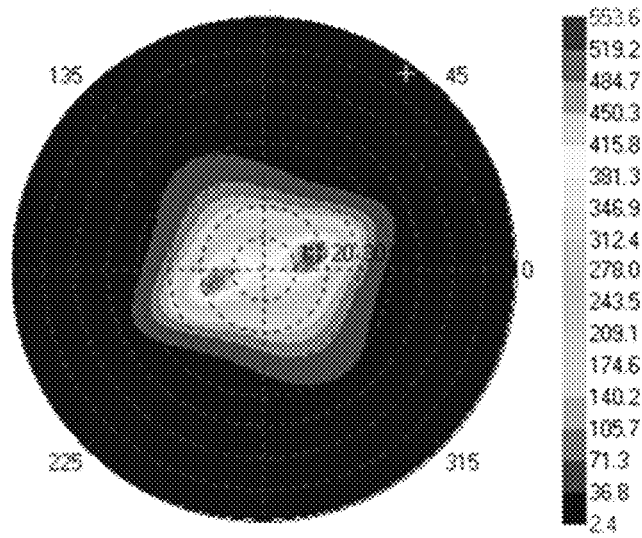
[Figure 6]
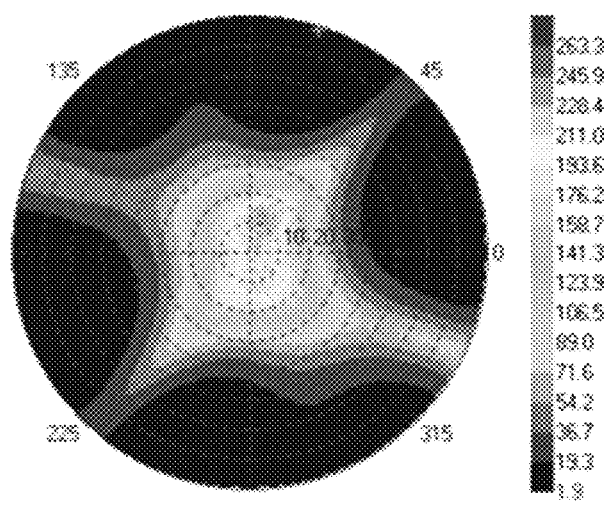

[Figure 7]
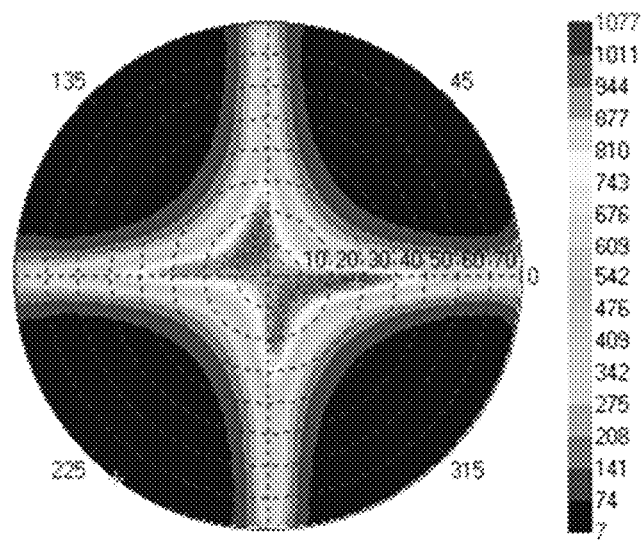

LAMINATE AND LIQUID CRYSTAL DISPLAY DEVICE COMPRISING SAME

The present application is a National Phase entry pursuant to 35 U.S.C. § 371 of International Application No. PCT/KR2019/006661 filed Jun. 3, 2019, and claims priority to and the benefit of Korean Patent Application No. 10-2018-0064879 filed in the Korean Intellectual Property Office on Jun. 5, 2018, the entire contents of which are incorporated herein by reference.

FIELD

This application relates to a laminate and a liquid crystal display comprising the same.

BACKGROUND

In recent years, as there has been a growing interest in information display and a demand for a portable information medium to be used has increased, research and commercialization of a lightweight thin film flat panel display (FPD), which replaces a cathode ray tube (CRT) which is the existing display device, have been mainly carried out. In particular, among such flat panel display devices, a liquid crystal display (LCD) as a device for displaying an image using optical anisotropy of a liquid crystal is excellent in resolution, color display, and image quality, and is actively applied to a notebook or a desktop monitor.

In such a liquid crystal display, liquid crystal molecules of a liquid crystal layer are driven by a difference in voltage applied to a common electrode and a pixel electrode.

Liquid crystals have features such as dielectric anisotropy and refractive anisotropy. Dielectric anisotropy means that the degree of polarization induced by an electric field varies depending on long axis and short axis directions of the liquid crystal, and refractive anisotropy means that a refractive index varies depending on the long axis and short axis directions of the liquid crystal, which causes a polarization state to be changed because the refractive index perceived varies according to a direction when light passes through the liquid crystal molecules.

As a result, the liquid crystal display has a liquid crystal panel constituted by a pair of transparent insulating substrates formed by planes facing each other with the liquid crystal layer interposed therebetween as a required component and arbitrarily controls the polarization of the liquid crystal molecules through a change in electric field between respective electric field generating electrodes and displays various images by using transmittance of light which is changed at this time.

In this case, a polarizer is located at each of upper and lower portions of the liquid crystal panel. The polarizer transmits the light of a polarization component, which coincides with a transmission axis to determine a transmission degree of light by arrangement of transmission axes of two polarizers and arrangement characteristics of the liquid crystals.

The polarizer used in the liquid crystal display in the related art is mainly a PVA elongated type in which iodine ions are aligned through stretching by using polyvinyl alcohol (PVA) having good adsorption ability with iodine.

SUMMARY

This application has been made in an effort to provide a liquid crystal display capable of resolving a size limitation of a polarizer and having an enhanced front CR characteristic.

An embodiment of this application provides a laminate comprising: a first half wave plate; a second half wave plate; and a positive C plate provided between the first half wave plate and the second half wave plate.

Further, another embodiment of this application provides a liquid crystal display comprising: an upper polarizer; a lower polarizer; and a liquid crystal panel provided between the upper polarizer and the lower polarizer, in which the upper polarizer and the lower polarizer are provided such that absorption axes thereof are parallel to each other, a first half wave plate, a positive C plate, and a second half wave plate are sequentially disposed between the upper polarizer and the liquid crystal panel, and the liquid crystal panel is a horizontal alignment liquid crystal mode.

According to an embodiment of this application, absorption axes of an upper polarizer and a lower polarizer of a liquid crystal display are provided to be parallel to each other, thereby resolving a size limitation of a polarizer according to a width of a polarizer raw material.

Further, according to an embodiment of this application, the first half wave plate, the positive C plate, and the second half wave plate are provided between an upper polarizer and a liquid crystal panel, and as a result, black luminance is reduced due to scattering of side light to increase a front contrast ratio (CR) as compared with a case where the first half wave plate, the positive C plate, and the second half wave plate are provided between a lower polarizer and the liquid crystal panel.

Further, according to an embodiment of this application, the positive C plate is provided between the first half wave plate and the second half wave plate to minimize light leakage at a viewing angle in a dark state, thereby finally minimizing reduction of a contrast ratio (CR).

BRIEF DESCRIPTION OF THE DRAWINGS

FIG. 1 is a schematic illustration of a structure of a liquid crystal display according to an embodiment of this application.

FIG. 2 is a schematic illustration of a structure of a liquid crystal display of Comparative Examples 1 and 2 of this application.

FIG. 3 is a diagram schematically illustrating a structure of a liquid crystal display according to Reference Example 1 of this application.

FIGS. 4 to 7 are diagrams illustrating omnidirectional light characteristics of liquid crystal displays according to Example 1, Comparative Example 1, Comparative Example 2, and Reference Example 1, respectively.

EXPLANATION OF REFERENCE NUMERALS AND SYMBOLS

10: Upper polarizer
20: Lower polarizer
30: Liquid crystal panel
40: First half wave plate
50: Positive C plate
60: Second half wave plate

DETAILED DESCRIPTION

Hereinafter, preferred embodiments of this application will be described. However, the embodiments of this application can be modified into various other forms, and the scope of this application is not limited to the embodiments described below. Further, the embodiments of this application are provided for more completely describing this application to those having average knowledge in the art.

In this specification, a case where a part "comprises" an element will be understood to imply the inclusion of stated elements but not the exclusion of any other elements unless explicitly described to the contrary.

In a liquid crystal display in the related art, an absorption axis of any one polarizer of an upper polarizer and a lower polarizer is set to 0 degree and the absorption axis of the other one polarizer is set to 90 degrees, and the absorption axes of the upper polarizer and the lower polarizer are orthogonal to each other. However, when the absorption axis of the polarizer is 90 degrees, a horizontal length of the polarizer is limited by the width of a roll of material that is used to manufacture the polarizer, which becomes a limiting factor for enlarging a product size. The maximum width of the roll of material that is used to manufacture a current polarizer is approximately 2600 mm, which means that a maximum size of a 21:9 standard TV is approximately 110 inches.

In order to improve the limitation on the size of such a polarizer, a method for transversely stretching a polyvinyl alcohol (PVA) film to form the absorption axis of a polarizer roll in the TD is proposed. However, even in such a case, unevenness due to lowering of the uniformity of the transverse stretching can occur and the degree of polarization due to the lowering of a stretching ratio can be reduced.

Thus, in this application, the absorption axes of the upper polarizer and the lower polarizer of the liquid crystal display are all set to 0 degree, thereby resolving the size limitation on the polarizer according to the width of the roll of polarizer raw material.

A laminate according to an embodiment of this application comprises: a first half wave plate; a second half wave plate; and a positive C plate provided between the first half wave plate and the second half wave plate.

Further, a liquid crystal display according to an embodiment of this application comprises: an upper polarizer; a lower polarizer; and a liquid crystal panel provided between the upper polarizer and the lower polarizer, the upper polarizer and the lower polarizer are provided so that absorption axes of the upper and lower polarizers are parallel to each other, a first half wave plate, a positive C plate, and a second half wave plate are sequentially provided between the upper polarizer and the liquid crystal panel, and the liquid crystal panel is a horizontal alignment liquid crystal mode.

In this application, the upper polarizer and the lower polarizer are provided such that the absorption axes thereof are parallel to each other. As described above, both of the absorption axes of the upper polarizer and the lower polarizer can be 0 degree in order to resolve the size limitation of the polarizer according to the width of a roll of polarizer raw material.

In this application, the case where the liquid crystal display comprises a first half wave plate, a positive C plate, and a second half wave plate between the upper polarizer and the liquid crystal panel is more preferable than the case where the liquid crystal display comprises the first half wave plate, the positive C plate, and the second half wave plate between the lower polarizer and the liquid crystal panel.

In this application, in regard to the upper polarizer and the lower polarizer, the polarizer attached to a TFT glass surface, which is a lower portion of the liquid crystal panel, based on the liquid crystal panel, is referred to as the lower polarizer and the polarizer attached to an upper portion of the liquid crystal panel which is the opposite side thereof is referred to as the upper polarizer.

Light emitted from a backlight unit (BLU) and incident on the lower polarizer has a black luminance rising element at a front due to scattering inside a cell in a lower panel. In this case, scattered light can be absorbed by the polarizer of an upper plate as long as there is no retardation of a lower plate, so that as compared with the case where the liquid crystal display comprises the first half wave plate, the positive C plate, and the second half wave plate between the lower polarizer and the liquid crystal panel, in the case where the liquid crystal display comprises the first half wave plate, the positive C plate, and the second half wave plate between the upper polarizer and the liquid crystal panel, the black luminance is reduced due to side light scattering, and as a result, a front CR is raised.

Further, in an embodiment of this application, the angle formed between the optical axis of the half wave plate of any one of the first half wave plate and the second half wave plate and the absorption axis of the upper polarizer can be 17.5 to 27.5 degrees, and can be 20 to 25 degrees, and the angle formed between the optical axis of the other one half wave plate and the absorption axis of the upper polarizer can be 62.5 to 72.5 degrees, and can be 65 to 70 degrees. When the angle deviates from the angle, 90-degree linearly polarized light conversion cannot be made (e.g., 0 degree→90 degrees), and as a result, the optical axis is not orthogonal to the absorption axis of the upper polarizer, and light leakage occurs in black and the C/R thus drops. As an ideal optical-axis angle, the angle formed between the optical axis of the first half wave plate and the absorption axis of the upper polarizer is 22.5 degrees, and the angle formed between the optical axis of the second half wave plate and the absorption axis of the upper polarizer is 67.5 degrees. The reason for setting the range is that consideration is given to manufacturing tolerance of a general optical film.

The first half wave plate and the second half wave plate can be made of materials known in the art and is not particularly limited. For example, polyolefin (polyethylene, polypropylene, polynorbornene and the like), amorphous polyolefin, polyimide, polyamideimide, polyamide, polyetherimide, polyetheretherketone, polyetherketone, polyketone sulfide, polyether sulfone, polysulfone, polyphenylene sulfide, polyphenylene oxide, polyethylene terephthalate, polybutylene terephthalate, polyethylene naphthalate, polyacetal, polycarbonate, polyarylate, polymethyl methacrylate, polymethacrylate, polyacrylate, polystyrene, cellulose-based polymer (such as triacetyl cellulose), PVA, epoxy resin, phenol resin, norbornene resin, polyester resin, acrylic resin, vinyl chloride resin, vinylidene chloride resin, etc., can be singly used or two or more thereof can be mixedly used, but this application is not limited thereto.

The first half wave plate and the second half wave plate can be obtained by forming the resin compositions and performing uniaxial or biaxial stretching. Further, as the first half wave plate and the second half wave plate, an alignment film in which a liquid crystalline polymer or a liquid crystalline monomer is aligned can be used.

The first half wave plate and the second half wave plate are retarders in which the retardation is implemented as half so that the relative phase difference between the e-ray and the o-ray becomes π. The phase difference can be represented as Δnd and the half wave plate can be manufactured by adjusting a thickness according to Δnd of a material.

In an embodiment of this application, independently in each of the first half wave plate and the second half wave plate, it is preferable that an $R_o(550)$ value is larger than an $R_o(450)$ value. The $R_o(450)$ can mean the front retardation value in 450 nm, $R_o(550)$ can mean the front retardation value in 550 nm, and the front retardation value $R_o$ can be represented by Equation 5 below.

$$R_o=(n_x-n_y)\times d \quad \text{[Equation 5]}$$

In Equation 5 above, $n_x$ represents a refractive index in a direction in which a plane-direction refractive index of the first half wave plate or the second half wave plate becomes the maximum, $n_y$ represents a vertical refractive index in an $n_x$ direction in a plane direction of the first half wave plate or the second half wave plate, and d represents a thickness of the first half wave plate or the second half wave plate.

More specifically, independently in each of the first half wave plate or the second half wave plate, an $R_o(450)/R_o(550)$ value can be in the range of 0.8 to 0.9.

In an embodiment of this application, the positive C plate is provided between the first half wave plate or the second half wave plate.

In this application, the positive C plate means a film having a refractive index distribution of $n_z>n_x=n_y$. In this case, $n_x$ represents a refractive index in a direction in which a plane-direction refractive index of the film becomes maximum, $n_y$ represents a vertical refractive index in an $n_x$ direction in a plane direction of the film, and $n_z$ represents a thickness-direction refractive index of the film.

The positive C plate which is known to the art can be used and is not particularly limited. More specifically, the positive C plate can be prepared by aligning a polymer film in an appropriate method or can be prepared by coating a polymerizable cholesteric liquid crystal compound on one surface of a substrate, aligning the polymer film in a predetermined direction, and then curing. When the polymerizable cholesteric liquid crystal compound is used, a zero retardation film can be used as the substrate. In this application, the zero retardation film means a film in which substantially no retardation occurs even though light is transmitted.

The generally used positive C plate as a vertical alignment liquid crystal layer can mean a liquid crystal polymer layer comprising substantially vertically aligned liquid crystals and the polymer layer can represent so-called characteristics of the positive C plate. In the above description, the characteristic of the positive C plate can mean that the refractive index $n_x$ in a slow axis direction is substantially equal to the refractive index $n_y$ in a fast axis direction and the refractive index $n_z$ in a thickness direction is larger than the refractive index $n_y$ in the fast axis direction ($n_z>n_y$). In the above description, the refractive index $n_x$ in the slow axis direction is substantially equal to the refractive index $n_y$ in the fast axis direction, and as a result, a case where there is a minute difference which occurs due to a process error, etc., is comprised in a scope of substantial equaling. Further, the vertical alignment liquid crystal layer can comprise some liquid crystals which are not vertically aligned if the vertical alignment liquid crystal layer shows the characteristics of the positive C plate. In addition, a dispersion characteristic can have a positive dispersion characteristic or a negative dispersion characteristic.

A thickness-direction retardation value $R_{th}$ of the positive C plate, which is represented by Equation 1 below in 550 nm can be in the range of 50 nm to 190 nm. Further, the front retardation value $R_o$ of the positive C plate, which is represented by Equation 2 below in 550 nm can be in the range of −5 nm to 5 nm or can be 0.

$$R_{th}=(n_z-n_y)\times d \quad \text{[Equation 1]}$$

$$R_o=(n_x-n_y)\times d \quad \text{[Equation 2]}$$

In Equations 1 and 2 above, $n_x$ represents a refractive index in a direction in which the plane-direction refractive index of the positive C plate becomes maximum, $n_y$ represents the vertical refractive index in the $n_x$ direction in the plane direction of the positive C plate, $n_z$ represents the thickness-direction refractive index of the positive C plate, and d represents a thickness of the positive C plate.

When a thickness-direction retardation value $R_{th}$ of the positive C plate deviates from the numerical range, horizontal and vertical asymmetry of the light characteristics can occur and black efficiency can be lowered, and as a result, the front CR value can be lowered.

The thickness-direction retardation value $R_{th}$ of the positive C plate can satisfy Equation 3 or 4 below.

$$R_{th}(450)<R_{th}(550)<R_{th}(650) \quad \text{[Equation 3]}$$

$$R_{th}(450)\geq R_{th}(550)\geq R_{th}(650) \quad \text{[Equation 4]}$$

In Equations 3 and 4 above, $R_{th}(450)$ means a thickness direction retardation at 450 nm, $R_{th}(550)$ means a thickness direction retardation at 550 nm, and $R_{th}(650)$ means a thickness direction retardation at 650 nm.

In particular, it is more preferable that the thickness-direction retardation value $R_{th}$ of the positive C plate satisfies Equation 3 above. When the thickness-direction retardation value $R_{th}$ of the positive C plate satisfies Equation 3 above, the thickness-direction retardation value $R_{th}$ has inverse-wave dispersibility and serves to collect a state of light spread for each wavelength at one point to the maximum to serve to prevent light leakage and color change at the viewing angle.

FIG. 1 is schematic illustration of a structure of a liquid crystal display according to an embodiment of this application. As illustrated in FIG. 1, a liquid crystal display according to an embodiment of this application comprises: an upper polarizer 10; a lower polarizer 20; and a liquid crystal panel 30 provided between the upper polarizer 10 and the lower polarizer 20, the upper polarizer 10 and the lower polarizer 20 are provided so that absorption axes of the upper and lower polarizers 10 and 20 are parallel to each other, a first half wave plate 40, a positive C plate 50, and a second half wave plate 60 are sequentially provided between the upper polarizer 10 and the liquid crystal panel 30, and the liquid crystal panel is a horizontal alignment liquid crystal mode.

The liquid crystal display according to an embodiment of this application comprises the positive C plate between the first half wave plate and the second half wave plate to minimize reduction of a contrast ratio (CR) at the viewing angle.

In an embodiment of this application, the liquid crystal display can additionally comprise a viewing angle compensation film between the second half wave plate and the liquid crystal panel or between the liquid crystal panel and the lower polarizer. The viewing angle compensation film which is known to the art can be used and is not particularly limited.

In an embodiment of this application, the upper polarizer, the lower polarizer, the liquid crystal panel, the first half wave plate, the positive C plate, and the second half wave plate can be bonded by using a water-based adhesive or a UV curing adhesive or bonded by using a PSA adhesive.

In this application, the upper polarizer and the lower polarizer can be polyvinyl alcohol based polarizers in which at least one of iodine and dichroic dyes is individually dyed.

As an example of the method for preparing the polyvinyl alcohol based polarizer, a method comprising a step of preparing a polyvinyl alcohol polarizer in which iodine and/or a dichroic dye is dyed and a step of laminating a protective film on one surface of the polarizer can be used. For example, the method is not limited thereto, but the step of preparing the polyvinyl alcohol based polarizer can comprise a step of dyeing the polyvinyl alcohol based polymer film with the iodine and/or the dichroic dye, a cross-linking step of cross-linking the polyvinyl alcohol based film and the dye, and a stretching step of stretching the polyvinyl alcohol based film.

A film for protecting the polarizer refers to a transparent film attached on one surface of the polarizer and can adopt a film which is excellent in mechanical strength, thermal stability, moisture shielding property, isotropy, and the like. For example, an acetate based film such as triacetyl cellulose (TAC), and polyester based, polyether sulfone based, polycarbonate based, polyamide based, polyimide based, polyolefin based, cycloolefin based, polyurethane based, and acryl based resin films can be used, but this application is not limited thereto.

In addition, the protective film can be an isotropic film, can be an anisotropic film having an optical compensation function such as the phase difference, can be composed of one sheet or can be composed of two or more sheets bonded together. Further, the protective film can be an unstretched, a uniaxially or biaxially stretched film, and the thickness of the protective film is generally 1 µm to 500 µm and preferably 1 µm to 300 µm.

Meanwhile, in the step of laminating the protective film on one surface of the polyvinyl alcohol based polarizer, the protective film is bonded to the polarizer and the protective film can be bonded to the polarizer by using the adhesive. In this case, the bonding can be performed through a joining method of the film well known to the art. For example, the bonding can be performed by using adhesives well known to the art, which comprise the aqueous adhesive such as the polyvinyl alcohol based adhesive, a thermosetting adhesive such as the urethane based adhesive, etc., a photo-cation curable adhesive such as the epoxy based adhesive, etc., and optical radical curable adhesives such as the acryl based adhesive, etc.

The liquid crystal display according to an embodiment of this application can additionally comprise a backlight unit. The backlight unit serves to supply light to the liquid crystal panel and a light source of the backlight unit can adopt any one of a cold cathode fluorescent lamp (CCFL), an external electrode fluorescent lamp (EEFL), a fluorescent lamp of a hot cold fluorescent lamp (HCFL), or a light emitting diode (LED).

In an embodiment of this application, the liquid crystal panel can be an In Plane Switching (IPS) mode liquid crystal panel or a Plane to Line Switching (PLS) mode liquid crystal panel.

Further, the types of the other constituent elements constituting the liquid crystal display, for example, upper and lower substrates (e.g., color filter substrate or array substrate) are not also particularly limited, and the configurations known in this field can be adopted without the limitation.

EXAMPLES

Hereinafter, the present invention will be described in more detail with reference to examples. The following Examples are provided to aid understanding of the present invention and are not thus intended to limit the present invention.

Examples

Example 1

A polarizer (LG Chemical Co., Ltd.) being mass-produced, which is laminated in a TAC/PVA/TAC structure (LG Chemical Co., Ltd.) was cut to have an absorption axis of 0 degree and used as a base substrate and a first half wave plate having an optical axis of 22.5 degrees, the positive C plate, and a second half wave plate having an optical axis of 67.5 degrees are sequentially laminated to the polarizer by using an adhesive (a U1 grade adhesive having a thickness of 20 µm). The laminated laminate was attached to an upper portion of an IPS panel (43-inch IPD LCD panel, LG Display) and a general polarizer used as the base substrate was attached to a lower portion of the IPS panel with an absorption axis of 0 degree.

At this time, each of the first half wave plate and the second half wave plate adopted a half wave plate having a wavelength dispersibility of $R_o(450)/R_o(550)=0.86$. Further, the positive C plate adopted a positive C plate (liquid crystal film, LG Chemical Co., Ltd.) having a thickness-direction retardation value of 140 nm and a front retardation value of 0.

The structure of Example 1 is schematically illustrated in FIG. 1.

Comparative Example 1

Like the structure of FIG. 2, Comparative Example 1 was performed similarly to Example 1 but without including the positive C plate.

Comparative Example 2

Like the structure of FIG. 2, Comparative Example 2 was performed similarly to Example 1 without including the positive C plate and each of the first half wave plate and the second half wave plate adopted a half wave plate having a wavelength dispersibility of $R_o(450)/R_o(550)=1.01$.

Reference Example 1

Like the structure of FIG. 3, a liquid crystal display in which the absorption axes of the upper polarizer and the lower polarizer are orthogonal to each other was manufactured.

Experimental Example 1

For the liquid crystal displays of Example 1, Comparative Example 1, Comparative Example 2, and Reference Example 1 above, a simulation was performed by using a Techwiz LCD 1D program and the simulation was verified by using a 43-inch IPS LCD TV. Evaluation equipment evaluated front luminance and viewing angle characteristics by ELDIM's EZ Contrast equipment and BM7.

The omnidirectional light characteristics of the liquid crystal display of Example 1 above are illustrated in FIG. 4, the omnidirectional characteristics of the liquid crystal display of Comparative Example 1 above are illustrated in FIG. 5, the omnidirectional light characteristics of the liquid crystal display of Comparative Example 2 above are illustrated in FIG. 6, and the omnidirectional light characteristics of the liquid crystal display of Reference Example 1 above are illustrated in FIG. 7.

TABLE 1

|  | C/R |
| --- | --- |
| Reference Example 1 | 1,077 (100%) |
| Embodiment 1 | 611 (57%) |
| Comparative Example 1 | 553 (51%) |
| Comparative Example 2 | 280 (26%) |

Like the result, according to an embodiment of this application, absorption axes of the upper polarizer and the lower polarizer of the liquid crystal display are provided to be parallel to each other, thereby resolving a size limitation of the polarizer according to the width of the roll of polarizer raw material.

Further, according to an embodiment of this application, the first half wave plate, the positive C plate, and the second half wave plate are provided between an upper polarizer and a liquid crystal panel, and as a result, black luminance is reduced due to scattering of side light to increase a front contrast ratio (CR) as compared with a case where the first half wave plate, the positive C plate, and the second half wave plate are provided between a lower polarizer and the liquid crystal panel.

Further, according to an embodiment of this application, the positive C plate is comprised between the first half wave plate and the second half wave plate to minimize light leakage at a viewing angle in a dark state, thereby finally minimizing reduction of a contrast ratio (CR).

The invention claimed is:

1. A liquid crystal display comprising:
an upper polarizer;
a lower polarizer; and
a liquid crystal panel provided between the upper polarizer and the lower polarizer,
wherein the upper polarizer and the lower polarizer are provided such that absorption axes thereof are parallel to each other,
a first half wave plate, a positive C plate, and a second half wave plate are sequentially provided between the upper polarizer and the liquid crystal panel, and
the liquid crystal panel is a horizontal alignment liquid crystal mode.

2. The liquid crystal display of claim 1, wherein an angle formed between the optical axis of any one half wave plate of the first half wave plate and the second half wave plate and the absorption axis of the upper polarizer is 17.5 degrees to 27.5 degrees, and
an angle formed between the optical axis of the other half wave plate and the absorption axis of the upper polarizer is 62.5 degrees to 72.5 degrees.

3. The liquid crystal display of claim 1, wherein a thickness-direction retardation value $R_{th}$ of the positive C plate represented by Equation 1 in 550 nm is 50 nm to 190 nm and a front retardation value $R_o$ represented by Equation 2 in 550 nm is −5 nm to 5 nm:

$$R_{th}=(n_z-n_y)\times d \quad \text{[Equation 1]}$$

$$R_o=(n_x-n_y)\times d \quad \text{[Equation 2]}$$

In Equations 1 and 2,
$n_x$ represents a refractive index in a direction in which the plane-direction refractive index of the positive C plate becomes maximum,
$n_y$ represents the vertical refractive index in the $n_x$ direction in the plane direction of the positive C plate,
$n_z$ represents the thickness-direction refractive index of the positive C plate, and
d represents a thickness of the positive C plate.

4. The liquid crystal display of claim 3, wherein the thickness-direction retardation value $R_{th}$ of the positive C plate satisfies Equation 3:

$$R_{th}(450)<R_{th}(550)<R_{th}(650) \quad \text{[Equation 3]}$$

In Equation 3, $R_{th}(450)$ means a thickness direction retardation at 450 nm, $R_{th}(550)$ means a thickness direction retardation at 550 nm, and $R_{th}(650)$ means a thickness direction retardation at 650 nm.

5. The liquid crystal display of claim 1, wherein independently in each of the first half wave plate and the second half wave plate, an $R_o(550)$ value is larger than an $R_o(450)$ value,
the $R_o(450)$ means a front retardation value in 450 nm and the $R_o(550)$ means the front retardation value in 550 nm, and
the front retardation value $R_o$ is expressed by Equation 5:

$$R_o=(n_x-n_y)\times d \quad \text{[Equation 5]}$$

In Equation 5,
$n_x$ represents a refractive index in a direction in which a plane-direction refractive index of the first half wave plate or the second half wave plate becomes the maximum,
$n_y$ represents a vertical refractive index in an $n_x$ direction in a plane direction of the first half wave plate or the second half wave plate, and
d represents a thickness of the first half wave plate or the second half wave plate.

6. The liquid crystal display of claim 1, further comprising:
a viewing angle compensation film between the second half wave plate and the liquid crystal panel or between the liquid crystal panel and the lower polarizer.

7. The liquid crystal display of claim 1, wherein each of the upper polarizer and the lower polarizer is independently a polyvinyl alcohol based polarizer containing at least one of iodine and dichroic dyes.

8. The liquid crystal display of claim 1, wherein the liquid crystal panel is an in plane switching (IPS) mode liquid crystal panel or a plane to line switching (PLS) mode liquid crystal panel.

* * * * *